United States Patent Office 3,009,900
Patented Nov. 21, 1961

3,009,900
STABILIZING POLYAMIDES
John Edward Hansen, Wilmington, Del., assignor to E. I. du Pont de Nemours and Company, Wilmington, Del., a corporation of Delaware
No Drawing. Filed Oct. 1, 1958, Ser. No. 764,499
5 Claims. (Cl. 260—45.75)

This invention relates to improving the moldability of articles made from certain nylon copolymers. More particularly, the present invention is directed to the incorporation of a combination of additives into the nylon copolymers in specific concentrations to markedly improve the ejectability from a mold of intricately shaped articles made from these copolymers.

It is known that various lubricants and nucleating agents may be incorporated into a polymer to alter its processing characteristics. Prior to the present invention, little success was obtained with these additives when used singly and when applied to the copolymers described herein.

An object of this invention is to provide a molding powder of a nylon copolymer which exhibits markedly improved mold ejectability due to the incorporation therein of a specific combination of additives. Other objects will become apparent from the following description.

The above objects are accomplished by providing a nylon copolymer molding powder composition comprising 75% to 99% by weight of polyhexamethylene adipamide and 1 to 25% by weight of at least one other nylon; said nylon being a macromolecular condensation product which has recurring carboxamide linkages as integral portions of the polymer chain of said nylon, and which upon hydrolysis yields monomeric compounds selected from the group consisting of (1) mixtures of dicarboxylic acids and diamines, and (2) omega-aminomonocarboxylic acids; said copolymer having incorporated therein from 0.10% by weight to 0.30% by weight of a nucleating agent selected from the class consisting of sodium phenylphosphinate and sodium isobutylphosphinate and from 0.05% by weight to 0.20% by weight of a metallic salt of a fatty acid having from 10 to 20 carbon atoms.

The additives of this invention when incorporated in the amounts disclosed herein into the nylon copolymers mentioned above transform the molding characteristics of these copolymers from that of poor to that of very satisfactory, and thus will allow commercial exploitation of these resins for the molding of intricately shaped objects. It should be noted that the incorporation of the additives of this invention in the copolymers also increases both the range of satisfactory molding temperatures and the speed of the molding cycles which may be used when molding these copolymers. The synergistic effect of the combination of additives of this invention improves ejectability from a mold of an article made from these nylon copolymers. This effect markedly exceeds the expected additive effect of each additive. For example, the incorporation of only sodium phenylphosphinate or sodium isobutylphosphinate in the copolymers gave little, if any, improvement in the ejectability of the molded articles, and the incorporation of a metallic salt of a fatty acid of from 10-20 carbon atoms such as zinc stearate only slightly increased the ejectability of the molded articles. Various lubricants and nucleating agents were tested as possible candidates for incorporation into these copolymers; however, the phosphinates and stearates mentioned above are far superior. The most effective, and therefore the preferred additives and the preferred range of concentration of these additives are from 0.09 to 0.12% by weight of zinc stearate and from 0.2 to 0.3% by weight of sodium phenylphosphinate. In addition, it has been determined that from 0.05 to 0.14% by weight of the metallic salts mentioned above and from 0.10 to 0.40% by weight of sodium phenyl phosphinate or sodium isobutylphosphinate is workable, and, therefore, is considered within the purview of this invention. Generally, the above-mentioned additives may be incorporated into the copolymer by coating the surface of the granular molding powder with the additives, followed by extruding the powder or by direct incorporation of the additives into the autoclave used to polymerize these copolymers. The method of incorporation of these additives into the copolymer is not critical as long as the additives are thoroughly dispersed in the copolymer. The additives of this invention may also be incorporated into physical mixtures of the above-mentioned nylons as well as in the above-mentioned copolymers.

The following examples are intended to illustrate, and not to restrict, the present invention.

EXAMPLE I

In this example the ejectability of an article made from a copolymer containing 75% of polyhexamethylene adipamide and 25% polyhexamethylene sebacamide was tested with and without the assistance of a specific nucleating agent and a specific lubricant. Five compositions were prepared by tumbling the copolymer granules with the additive or additives in powdered form for approximately 24 hours and then by melt extruding each composition to obtain a molding powder. The compositions with the particular additives are given below in Table I.

Table I

| Composition | Additives (percent by weight) |
| --- | --- |
| 1 | None. |
| 2 | 0.13% "Acrawax" C[1] lubricant. |
| 3 | 0.25% Sodium phenylphosphinate nucleating agent. |
| 4 | 0.12% Zinc stearate lubricant. |
| 5 | {0.12% Zinc stearate. <br> {0.25% Sodium phenylphosphinate. |

[1] The bisstearamide of ethylene diamine.

Each composition was molded using a 6-ounce Watson and Stillman injection machine and a tumbler mold which, because of its large surface to volume ratio, is a good mold to evaluate polymer ejectability. The following general conditions as shown in Table II were used:

Table II

Cylinder temperature _____ 260 to 280° C.
Mold temperature _____ 30 to 80° C.
Ram pressure _____ 10,000 to 20,000 p.s.i.g.
Cycle timing _____ 10–30 sec. ram forward, 20–30 sec. ram back.

It was impossible to obtain a set of conditions under which compositions 1 thru 4 could be satisfactorily molded because the tumblers which were molded from these compositions (1 thru 4) stuck to the molds and interrupted the molding cycle. Composition 5 was molded under practically the entire range of conditions given above, and under any set of these conditions the tumblers were easily ejected from the molds.

EXAMPLE II

In this example a copolymer containing 90% of polyhexamethylene adipamide and 10% by weight polycaprolactam was used to make five compositions with additives similar to the additives in the compositions of Example I. Substantially the same results were obtained as in Example I. The combination of sodium phenylphosphinate and zinc stearate in the copolymer resulted in a marked increase in the ejectability of the molded tumblers.

The scope of this invention is not limited to the two copolymers and additives which are described in the above examples. Other copolymers such as the condensation products of 1,1,6,6-tetramethylhexamethylene diamine and sebacic acid; 2,5-dimethylpiperazine and glutaric acid; hexamethylene diamine and succinic acid; 2,5-dimethylpiperazine and suberic acid; and hexamethylene diamine and glutaric acid are operable, and therefore within the scope of this invention. Terpolymers are also operable and within the scope of the invention. A typical example of a workable terpolymer is one which contains about 75% polyhexamethylene adipamide, about 10% polycaprolactam, and about 15% polyhexamethylene sebacamide. These copolymers may be further modified by the incorporation of pigments, fillers, printing or other decorative matter. Nucleating agents, such as finely divided silver halides, alkaline earth oxides, and very fine silicas and aluminas in combination with lubricants such as fatty acids, long-chain aliphatic alcohols, and fatty amines although probably much less effective than the combinations disclosed above and claimed herein, might also be used in the practice of this invention.

The combination of additives of this invention may be incorporated into a suitable polymer or copolymer to enhance the physical properties of the polymer with respect to moldability. The use of this combination of additives in the copolymers described herein will permit commercialization of said copolymers by markedly improving their ejectability from a mold. These copolymers may be subsequently used in the manufacture of irregularly shaped objects such as bottles, toys, tumblers, dishes, combs, gears, valves, and various hardware items such as drapery slides.

I claim:

1. A nylon copolymer molding powder comprising 75% to 99% by weight of polyhexamethylene adipamide and 25% to 1% by weight of at least one other polyamide; said latter polyamide being a macromolecular condensation product which has recurring carboxamide linkages as integral portions of the polymer chain of said later polyamide, and which upon hydrolysis yields monomeric compounds selected from the group consisting of (1) mixtures of dicarboxylic acids and diamines, and (2), omega-aminomonocarboxylic acids; said copolymer having incorporated therein from 0.10% to 0.30% by weight of a nucleating agent selected from the class consisting of sodium phenylphosphinate and sodium isobutyl phosphinate and from 0.05% to 0.20% by weight of zinc stearate.

2. A nylon copolymer molding powder which comprises 25 parts by weight of polyhexamethylene sebacamide and 75 parts by weight of polyhexamethylene adipamide, and which has incorporated therein from 0.10% to 0.30 by weight of sodium phenylphosphinate and from 0.05% to 0.20% by weight of zinc stearate.

3. A nylon copolymer molding powder which comprises 10 parts by weight of polycaprolactam and 90 parts by weight of polyhexamethylene adipamide, and which has incorporated therein from 0.10% to 0.30% by weight of sodium phenylphosphinate and from 0.05% to 0.20% by weight of zinc stearate.

4. A nylon copolymer molding powder for injection molding consisting essentially of 75% to 90% by weight of polyhexamethylene adipamide and 25% to 10% by weight of at least one other polyamide; said latter polyamide being a macromolecular condensation product which has recurring carboxamide linkages as integral portions of the polymer chain of said latter polyamide, and which upon hydrolysis yields monomeric compounds selected from the group consisting of (1) mixtures of dicarboxylic acids and diamines, and (2) omega-aminomonocarboxylic acids; said copolymer having incorporated therein from 0.10% to 0.30% by weight of a nucleating agent selected from the class consisting of sodium phenylphosphinate and sodium isobutyl phosphinate and from 0.05% to 0.20% by weight of zinc stearate.

5. A nylon copolymer molding powder for injection molding consisting essentially of 75% to 90% by weight of polyhexamethylene adipamide and 25% to 10% by weight of one other polyamide; said latter polyamide being a macromolecular condensation product which has recurring carboxamide linkages as integral portions of the polymer chain of said latter polyamide, and which upon hydrolysis yields monomeric compounds selected from the group consisting of (1) mixtures of dicarboxylic acids and diamines, and (2) omega-aminocarboxylic acids; said copolymer having incorporated therein from 0.2% to 0.3% by weight of sodium phenylphosphinate and from 0.09% to 0.12% by weight of zinc stearate.

References Cited in the file of this patent

UNITED STATES PATENTS

| | | |
|---|---|---|
| 2,193,529 | Coffman | Mar. 12, 1940 |
| 2,705,227 | Stamatoff | Mar. 29, 1955 |
| 2,852,485 | Stott et al. | Sept. 16, 1958 |